US012409688B2

(12) United States Patent
Stubbs (10) Patent No.: US 12,409,688 B2
(45) Date of Patent: Sep. 9, 2025

(54) TOWING SYSTEM WHEREIN AN INTERNAL COMBUSTION ENGINE IS ASSISTED BY AN ELECTRIC VEHICLE BEING TOWED

(71) Applicant: Rustee Stubbs, Washington, UT (US)

(72) Inventor: Rustee Stubbs, Washington, UT (US)

( * ) Notice: Subject to any disclaimer, the term of this patent is extended or adjusted under 35 U.S.C. 154(b) by 212 days.

(21) Appl. No.: 18/449,148

(22) Filed: Aug. 14, 2023

(65) Prior Publication Data
US 2024/0051361 A1    Feb. 15, 2024

Related U.S. Application Data

(60) Provisional application No. 63/381,697, filed on Oct. 31, 2022, provisional application No. 63/371,255, filed on Aug. 12, 2022.

(51) Int. Cl.
| | |
|---|---|
| B60D 1/64 | (2006.01) |
| B60D 1/01 | (2006.01) |
| B60L 15/20 | (2006.01) |
| B60R 13/10 | (2006.01) |
| G07C 5/08 | (2006.01) |
| H01F 7/00 | (2006.01) |
| H01F 7/06 | (2006.01) |

(52) U.S. Cl.
CPC ............. *B60D 1/64* (2013.01); *B60D 1/01* (2013.01); *B60L 15/2009* (2013.01); *B60R 13/105* (2013.01); *H01F 7/064* (2013.01); *G07C 5/0808* (2013.01)

(58) Field of Classification Search
None
See application file for complete search history.

(56) References Cited

U.S. PATENT DOCUMENTS

| 8,678,121 | B2 * | 3/2014 | Troy | ............... G01D 11/30 |
| | | | | 73/635 |
| 11,084,342 | B2 * | 8/2021 | Reed | ............... G01L 5/136 |

* cited by examiner

*Primary Examiner* — Abdhesh K Jha
(74) *Attorney, Agent, or Firm* — Gurr & Brande, PLLC; Robert A. Gurr (57) ABSTRACT

An EV couples to an ICEV via mechanical or electromagnetic tow system for towing and includes an ICEV module and an EV module that are configured to communicate with one another. This connection uses software that is configured to assist the vehicles to both work in unison and to optimize performance of the traction control, brakes, throttle, battery systems, and other components. In some examples, the EV is capable of utilizing full self-driving (FSD) to connect and disconnect from the ICEV, as well as assist in lane changing, backing up, braking, and acceleration in response to road and traffic conditions.

13 Claims, 10 Drawing Sheets

TOWING SYSTEM WHEREIN AN INTERNAL COMBUSTION ENGINE IS ASSISTED BY AN ELECTRIC VEHICLE BEING TOWED

CROSS-REFERENCE TO RELATED APPLICATIONS

This application claims the benefit of U.S. Provisional Application Ser. No. 63/381,697, filed on Oct. 31, 2022 and U.S. Provisional Application Ser. No. 63/371,255 filed on Aug. 12, 2022, both of which are incorporated herein by reference.

TECHNICAL FIELD

The present disclosure relates to towing an electric vehicle with an internal combustion engine vehicle. More specifically, the present disclosure relates to a towing system wherein an electric vehicle may be programmed and configured to assist the internal combustion engine vehicle while in motion.

BACKGROUND

Hybrid vehicles are any vehicle that runs on two sources of power. The most common hybrid powertrain assembly combines a gasoline engine with an electric motor. These vehicles are known as hybrid electric vehicles (HEVs). However, most vehicles are not HEVs but are internal combustion engine vehicles (ICEVs). Many ICEVs, such as motorhomes, will tow an electric vehicle (EV) for daily use while at a destination, allowing the larger motorhome to remain parked and conserve fuel and without having to stow all of a user's gear and pull up the stakes every time a user wants to go somewhere. Instead, the user will simply use the EV that was towed for their daily transportation needs.

Many modern EVs are programmed with autopilot or full self-driving (FSD)—advanced driver assistance systems that enhance safety and convenience behind the wheel. When used properly, these systems reduce the overall workload as a driver. External cameras and powerful vision processing software within the onboard computer facilitate the ease of driving while also providing an additional layer of safety. To date, however, the batteries within electric vehicles, as well as the cameras and software that enable full self-driving mode, have not been integrated to assist the more common, often less technically advanced, ICEVs that tow EVs.

Accordingly, there is a need for a towing system wherein the EV can assist the ICEV when being towed, effectively turning the ICEV into an HEV and integrating the advanced driver assistance systems with the tow vehicle. The present disclosure seeks to solve these problems and others.

SUMMARY OF EXAMPLE EMBODIMENTS

In some embodiments, a towing system comprises an EV mechanically coupled to an ICEV for towing and comprises an ICEV module and an EV module that are configured to communicate to one another. This connection comprises software that is configured to assist the vehicles to both work in unison and to optimize performance of the traction control, brakes, throttle, battery systems, and other components.

In some embodiments, the towing system comprises a hitch and a hitch receiver, wherein the hitch features a housing, an elongated shaft, a wiring harness, a first electromagnetic plate, and a hitch coupler configured to function as a latching mechanism; the hitch receiver comprises a second electromagnetic plate and a receiver tube having an inner channel configured to receive the hitch coupler. In particular, a connection between the first electromagnetic plate and the second electromagnetic plate may be magnetically disengaged in emergency circumstances allowing the EV to avoid accidents.

In some embodiments, the EV is capable of utilizing full self-driving (FSD) to connect and disconnect from the ICEV, as well as assist in lane changing, reversing, braking, and acceleration.

DETAILED DESCRIPTION OF EXAMPLE EMBODIMENTS

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a towing system that enables cooperative communication and dynamic interaction between a self-driving EV when being towed by an ICEV. In particular, the towing system disclosed herein enables the self-driving EV to assist in steering control, lane changes, shifting, and deacceleration while also charging the EV's battery through regenerative braking while being towed by a traditional ICEV.

Figure 1:
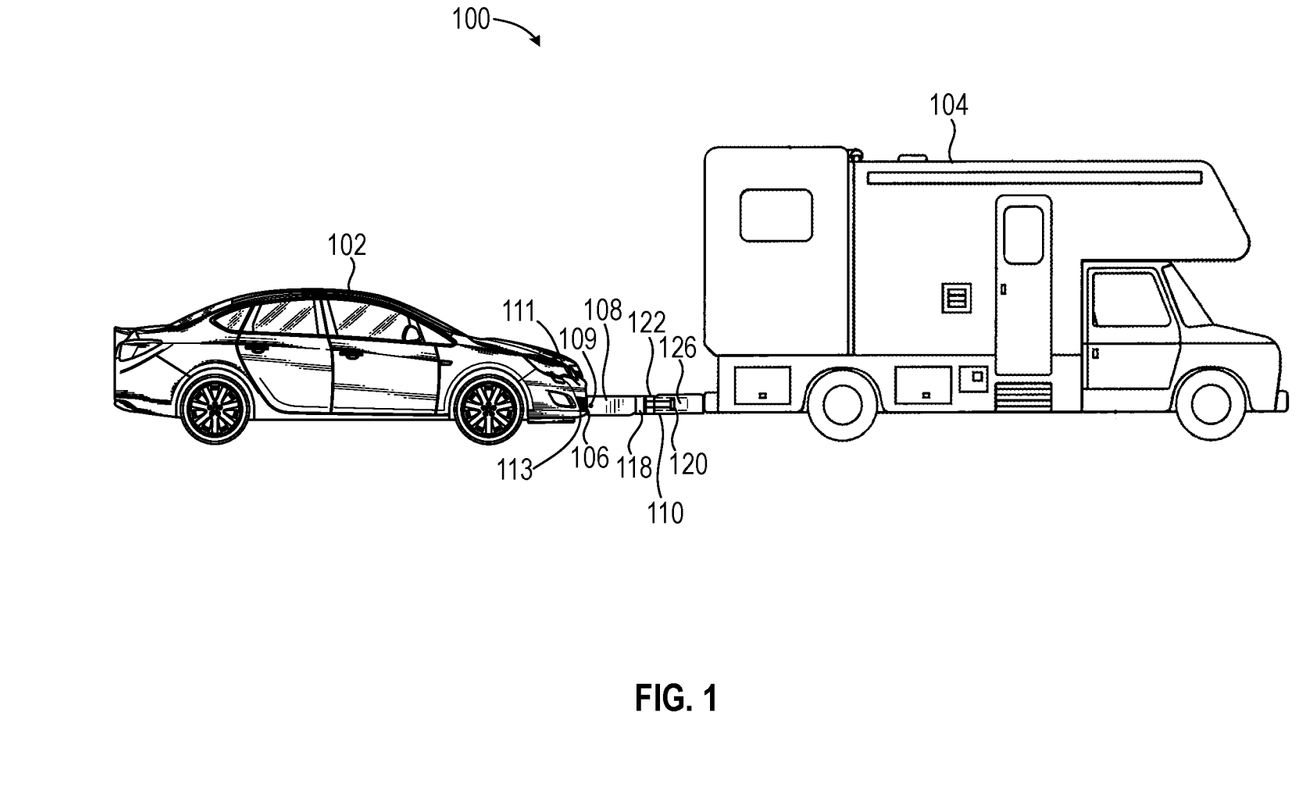
FIG. 1 illustrates a side elevation view of a towing system, with an ICEV towing an EV.
Figure 2:
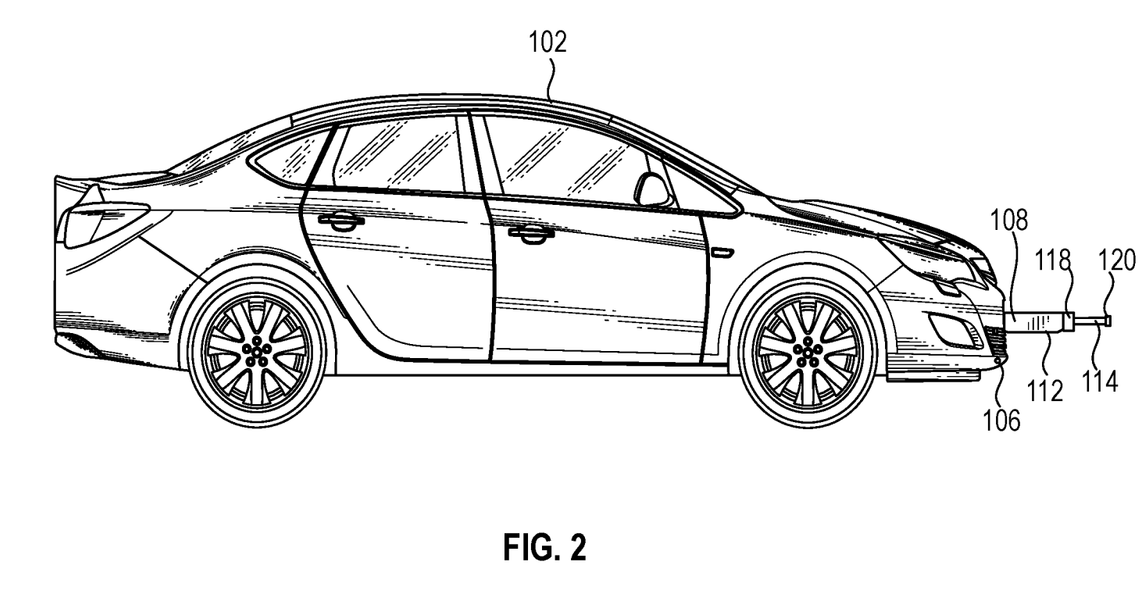
FIG. 2 illustrates a side elevation view of an EV including a towing system.
Figure 3:
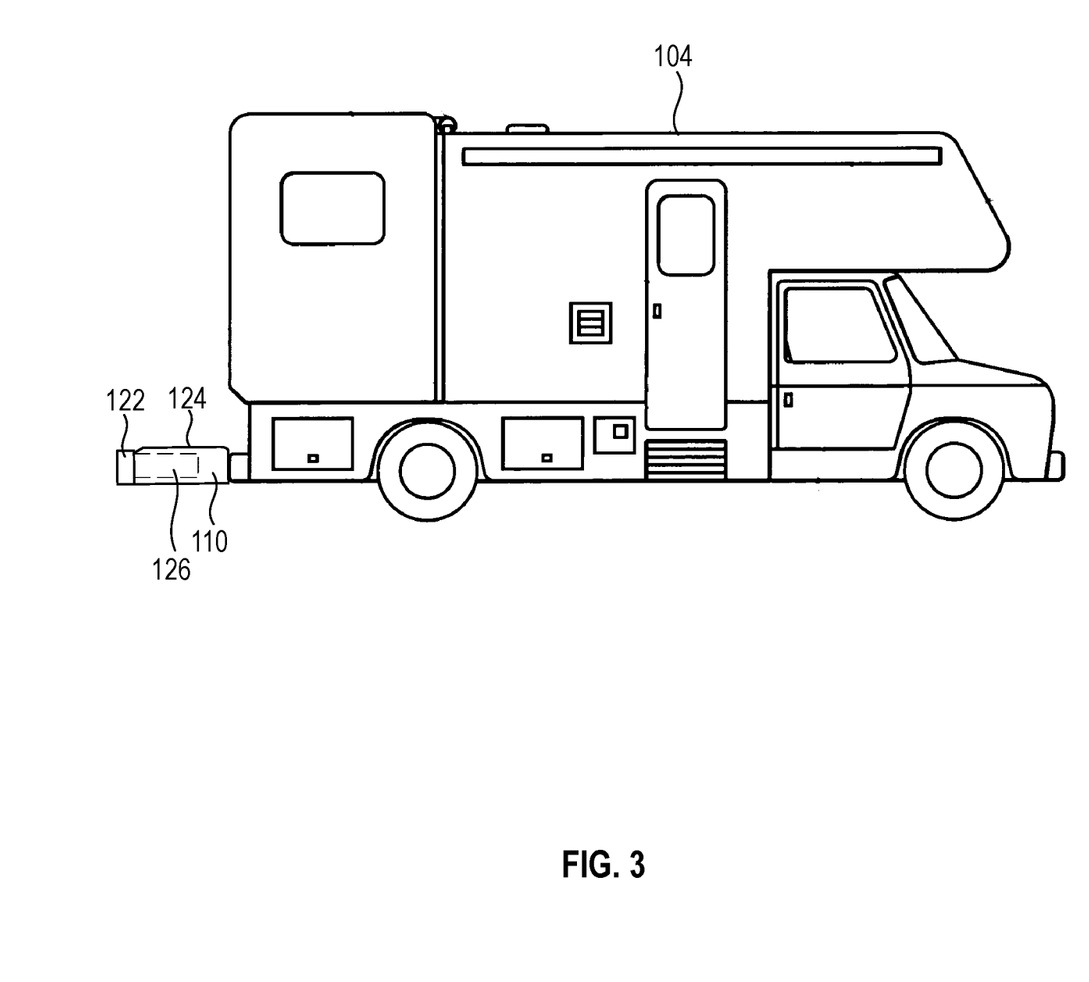
FIG. 3 illustrates a side elevation view of an ICEV including a towing system.

In some embodiments, as shown in FIGS. 1-3, a towing system 100 comprises an EV 102, an ICEV 104, a sensor 106, a hitch 108, and a hitch receiver 110. The hitch 108 is coupled to a front end of the EV 102. In some embodiments, the hitch 108 may be decoupled from the EV 102 using a hitch pin 109 or other standard methods known in the art of towing. In some embodiments, the hitch 108 may comprise a hinge that is configured to pivot the hitch 108 so as to not longitudinally extend from the front of the EV 102 when not in use. For example, the hitch 108 may pivot to abut the bumper 111 or may extend vertically upward or downward from the front of the EV 102. In some embodiments, the bumper 111 may comprise a chamber 113 to conceal the hitch 108 when not in use. The hitch 108 may also be configured to automatically raise at a hinge point when the EV 102 decouples from the ICEV 104. This storage configuration may be either spring-activated or effectuated via an electrical actuator system.

Additionally, in some embodiments, the hitch 108 may withdraw into the vehicle longitudinally for storing within a front section of the EV 102. This may be accomplished using linear actuators, such as electric screw drives or other similar actuators that would allow for horizontal linear movement while maintaining integrity for towing. Because the EV 102 lacks an engine in the front, there is ample space for the hitch 108 to withdraw therein. As shown in FIG. 3, the hitch receiver 110 is coupled to a rear end of the ICEV 104. During towing (FIG. 1), the hitch 108 is mechanically coupled to the hitch receiver 110 which may be facilitated through standard flat towing protocols behind an RV or using other methods, as will be discussed later herein.

Figure 4:
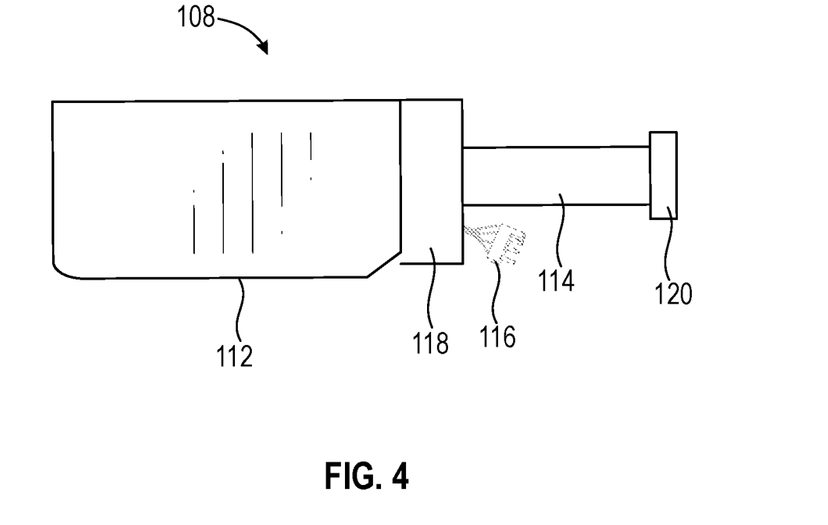
FIG. 4 illustrates a side elevation view of a hitch of a towing system.
Figure 5:
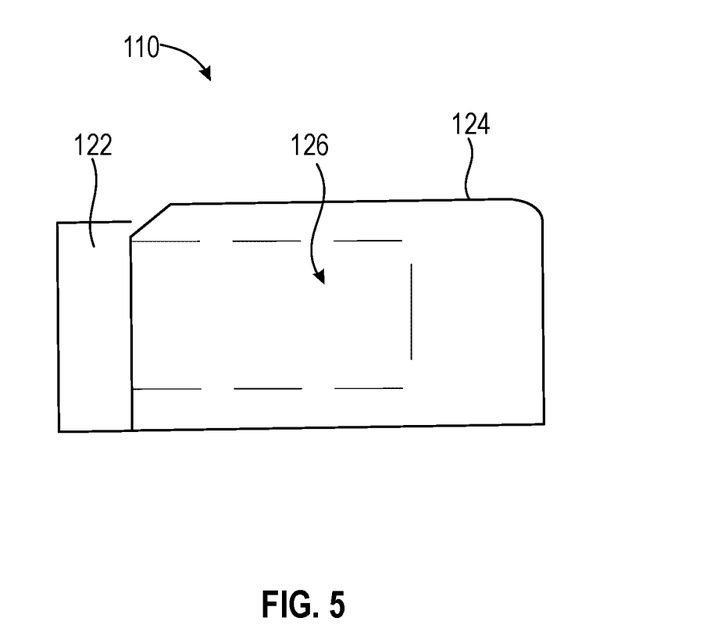
FIG. 5 illustrates a side elevation view of a hitch receiver of a towing system.

As best seen in FIG. 4, the hitch 108 comprises a housing 112, an elongated shaft 114, a wiring harness 116, a first electromagnetic plate 118, and a hitch coupler 120 configured to function as a latching mechanism. In some embodiments, as best seen in FIG. 5, the hitch receiver 110 comprises a second electromagnetic plate 122 and a receiver tube 124 having an inner channel 126 configured to receive the hitch coupler 120.

Figure 6:
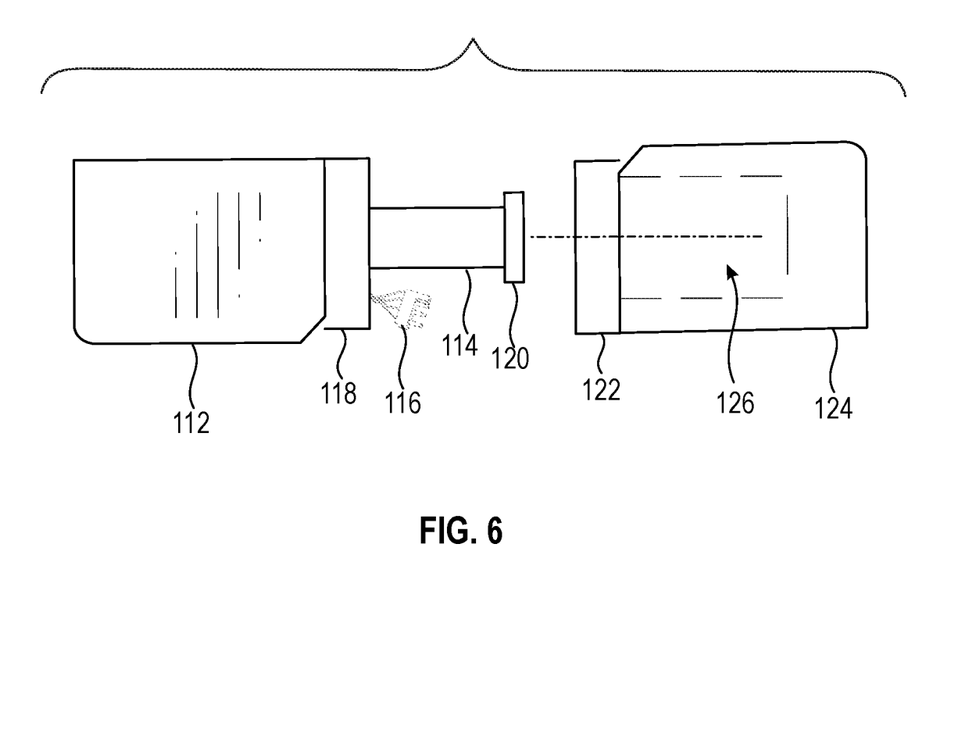
FIG. 6 illustrates a side elevation view of a towing system de-coupled.
Figure 7:
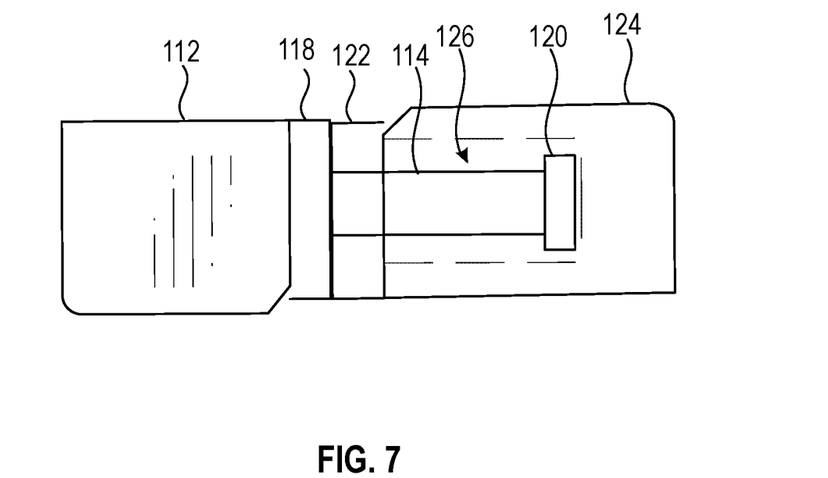
FIG. 7 illustrates a side elevation view of a towing system coupled.

As shown in FIGS. 6-7, the first electromagnetic plate 118 is couplable to the second electromagnetic plate 122 and may be magnetically disengaged in emergency circumstances when, for example, lateral forces exceed a predetermined threshold that could otherwise cause uncontrolled whipping of the EV 102, or in situations where the ICEV 104 is in an accident or drives off the road. The FSD feature of the EV 102 paired with the decouplable magnetic engagement feature (118, 122) of the towing system 100 removes the need for traditional safety chains and breakaway cables. Alternatively, in some embodiments, the elongated shaft 114 may function as the first electromagnetic plate 118 and magnetically couple with the second electromagnetic plate 122 along a longitudinal axis of the inner channel 126 of the receiver tube 124.

Figure 8:
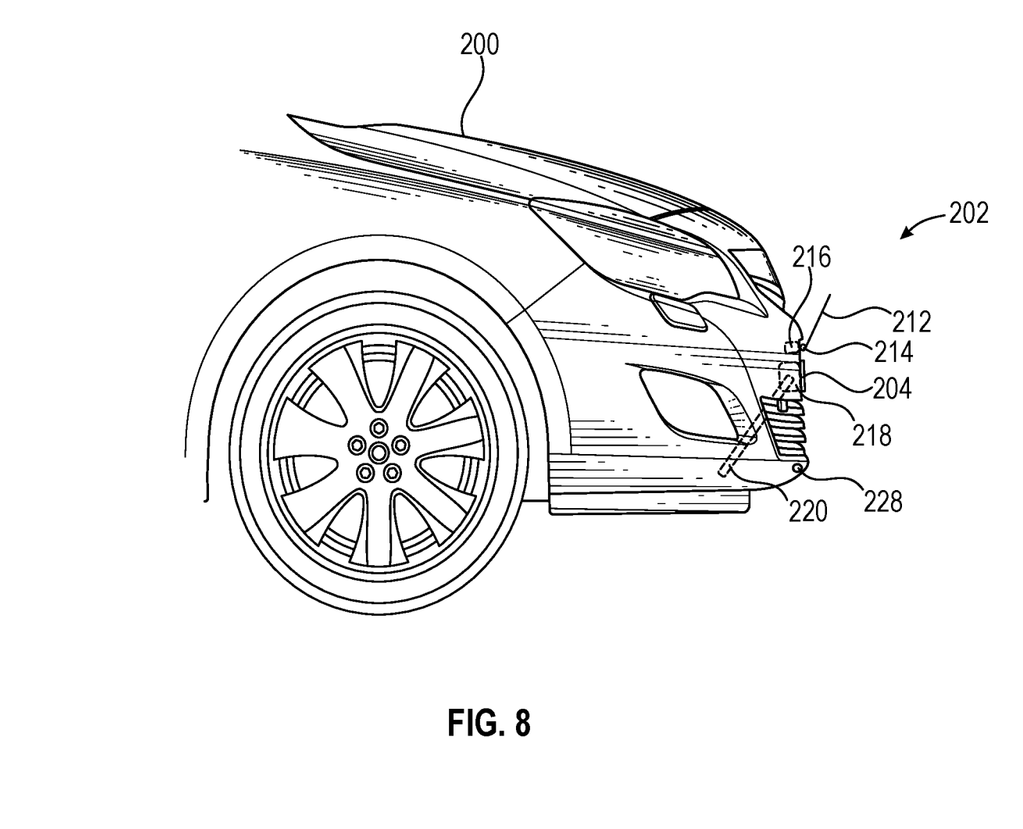
FIG. 8 illustrates a side elevation view of an EV including a towing system.
Figure 9:
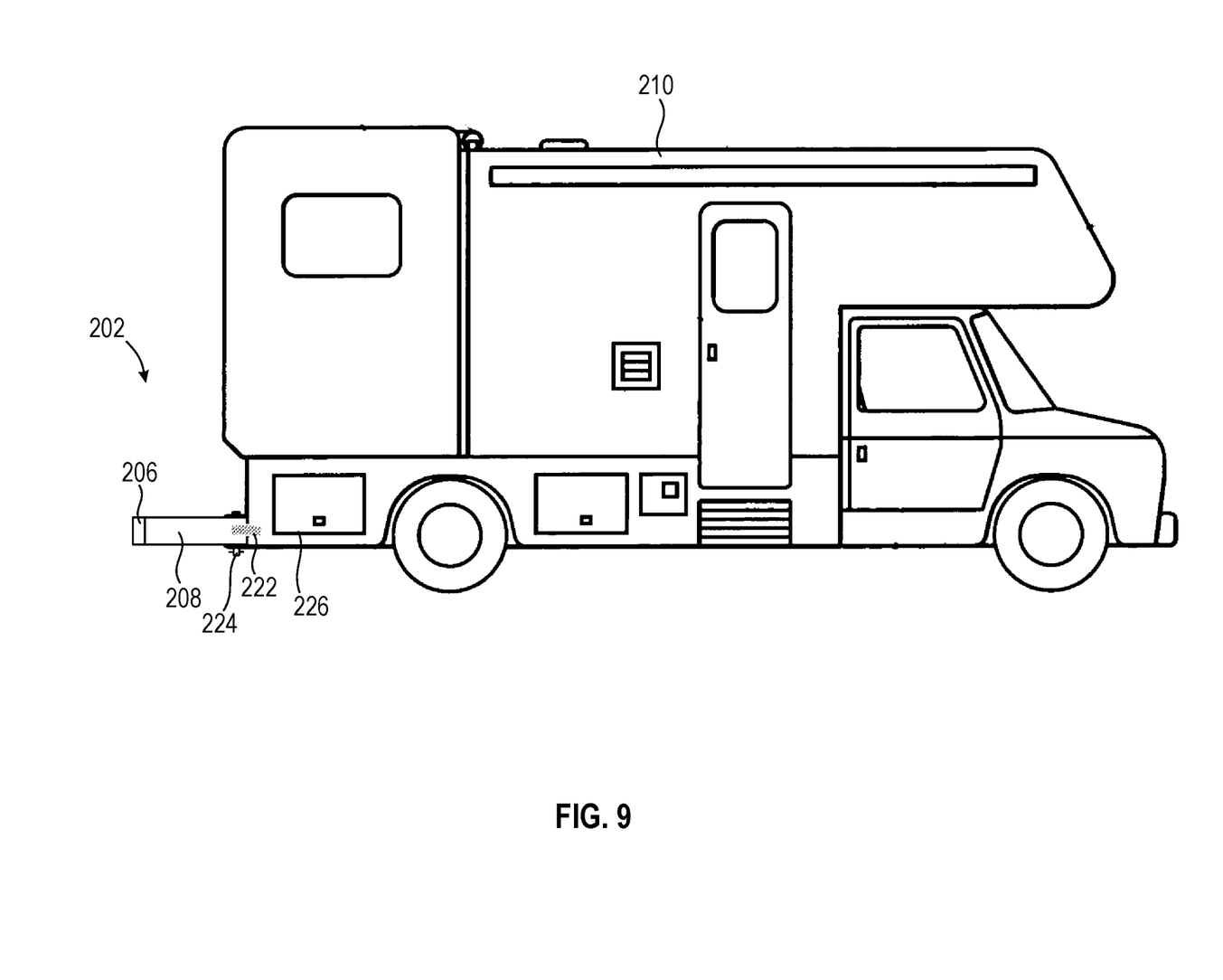
FIG. 9 illustrates a side elevation view of an ICEV including a towing system.

In some embodiments, as shown in FIGS. 8-9, an EV 200 comprises a towing system 202 comprising an EV electromagnet 204 for coupling to a tongue electromagnet 206 coupled to a tongue 208 that extends from an ICEV 210. In some embodiments, a license plate 212 may pivot on a hinge 214 to thereby selectively conceal or expose the EV electromagnet 204. The hinge 214 may be manually actuatable or may be electronically actuated using an electric motor 216 or similar mechanism. As a result, when not in use, the license plate 212 may pivot to conceal the EV electromagnet 204. When a user desires to tow the EV 200, the user may actuate the hinge 214 of the license plate 212, such as by using the electric motor 216, which thereby pivots the license plate 212 away from the EV electromagnet 204 to thereby expose the EV electromagnet 204. Once exposed, the EV electromagnet 204 may be magnetized using known components (e.g., ferromagnetic rod with a wire coil thereon coupled to a power source) within a housing 218.

The EV electromagnet 204 is coupled (e.g., welded, bolted, etc.) to the frame of the EV 200 via one or more structural members 220 (e.g., steel rods, beams, etc.) to ensure that the EV 200 is towed without damage to the body or other components. For example, a first structural member may extend to the vehicle frame on a first side and a second structural member may extend to the vehicle frame on a second side. While the EV electromagnet 204 is described as being concealable behind a license plate 212, it will be appreciated that it need not be concealed and may be positioned so as to remain exposed. In some embodiments, the EV electromagnet 204 may be painted to match the color of the EV 200 or may have other decoration thereon.

The tongue 208 may be horizontally and/or vertically pivotable on the ICEV 210 to facilitate easier turning while towing, differences in elevation (bumps on the road), and other benefits. Absent external force, the tongue 208 may remain in a generally longitudinal direction of the ICEV 210 using one or more springs 222 or similar mechanisms. In some embodiments, the tongue 208 is removably couplable to the ICEV 210, such as via a hinge pin 224. In some embodiments, the tongue 208 may be pivotable for storing in a vertical or horizontal position adjacent to the ICEV 210, which may be accomplished with manual actuation or electronic motor actuation. In some embodiments, the tongue 208 may be configured to withdraw into a storage area 226 of the ICEV 210 when not in use, such as by using linear actuators (e.g., screw drives, hydraulic drives, etc.).

While described as using two electromagnets (EV electromagnet 204 and tongue electromagnet 206), two are not required. For example, either the EV 200 or the ICEV 210 may comprise an electromagnet with the opposite vehicle comprising a strongly magnetic material, such as iron or steel, to which the electromagnet may couple. If the ICEV 210 includes the tongue electromagnet 206 with a removable tongue 208, any required electrical connections may be made using a wire harness and plugs that extend through the tongue 208 to the ICEV 210.

The towing system 100, 202 may further comprise a software interface that facilitates communication between an ICEV module on an onboard computer of the ICEV 104, 210 and an EV module on an onboard computer of the EV 102, 200, wherein the software interface is configured to assist the vehicles to work together in tandem to achieve the optimal performance of each vehicle, including helping with the anti-lock braking system, traction control, throttle management, battery charging systems, and other vehicle components.

Moreover, the software may enable the EV 102, 200 to assist the ICEV 104, 210 while reversing or while parallel parking by controlling the alignment and direction of the wheels. The connection between the EV module and the ICEV module may be physically wired together through the wiring harness 116 on the hitch 108 or tongue 208 and the standard towing pin connection on the ICEV 104, 210 or other towing wire harness. In some embodiments, the electromagnets 204, 206 may comprise plugs or contacts that allow for electronic communication between the EV 200 and ICEV 210.

Figure 10:
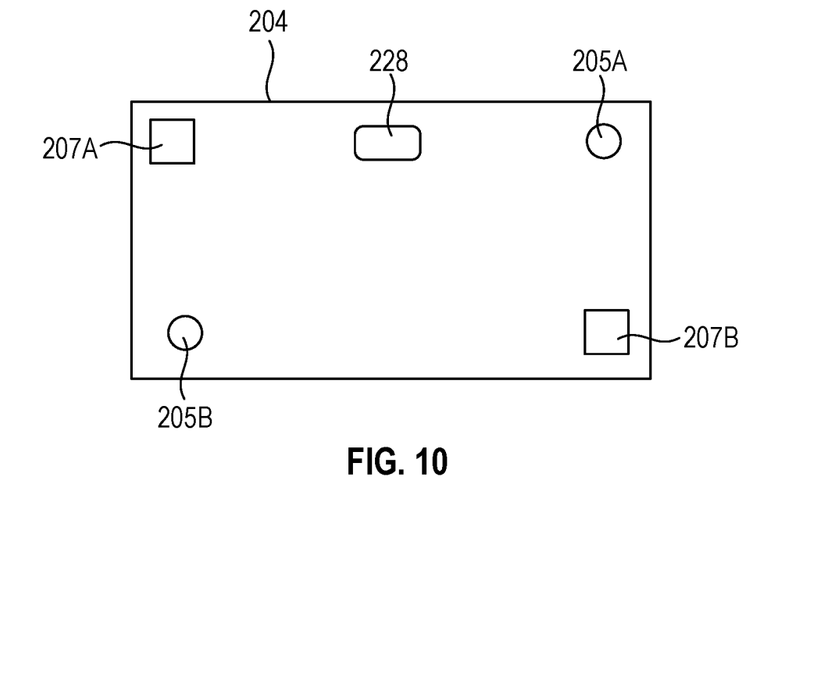
FIG. 10 illustrates a front elevation view of an EV electromagnet.
Figure 11:
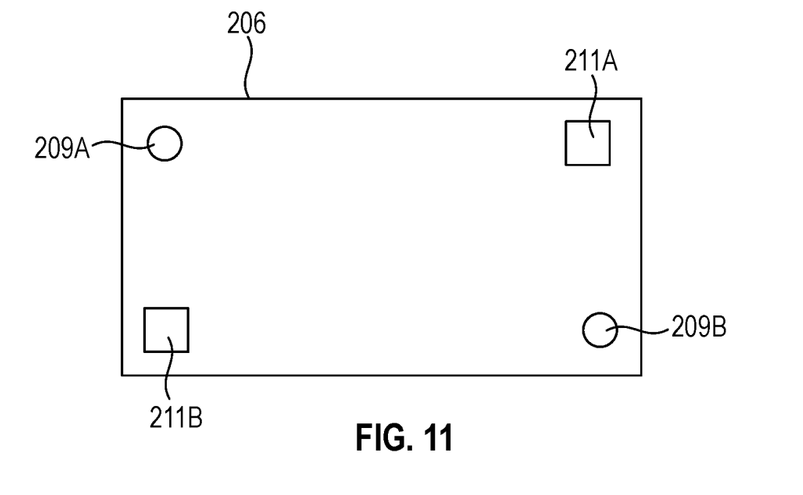
FIG. 11 illustrates a front elevation view of a tongue electromagnet of an ICEV.

For example, as shown in FIGS. 10-11, the EV electromagnet 204 may comprise one or more high-voltage electrical contacts 205A-B wired to a towing control module (TCM) 230 (discussed more fully below and in FIG. 12) of the electric vehicle 200 and one or more signal contacts 207A-B. In some examples, the wiring may include high-voltage power wires and signal wires that allow a controller (e.g., TCM 230) to determine when to send power through the high-voltage wires and to the electrical contacts 205A-B and when to send communications between the vehicle modules and power systems. The tongue electromagnet 206 likewise comprises high-voltage electrical contacts 209A-B that are arranged and sized so as to make direct contact with electrical contacts 205A-B, and signal contacts 211A-B arranged and sized so as to make direct contact with signal contacts 207A-B when the electromagnets 204, 206 are magnetically coupled together. As a result, a controller, such as TCM 230, detects that the connections are complete (i.e., the electromagnets 204, 206 are properly coupled) via the signal contacts 207A-B and signal contacts 211A-B. As a result, the TCM 230 (or other controller systems) may transmit DC power through the high-voltage wires through the high-voltage contacts 205A-B, 209A-B, allowing DC power (or if inverted AC power) to flow between the two vehicles as determined by the TCM 230. Using signal contacts 207A-B and 211A-B ensures that the high-voltage contacts 205A-B and 209A-B are not "live" or "hot" when the electromagnets 204, 206 are not coupled to one another, preventing shock or other danger to a user.

In some embodiments, the connection between the EV module and the ICEV module is wireless, wherein the connection may be through Bluetooth®, Wi-Fi®, or other known communication protocols.

In some embodiments, the EV 102, 200 may use external cameras and/or sensors 106, 228 (e.g., proximity sensors) to connect using full self-driving (FSD). It will be appreciated that the EV 102, 200 may connect and disconnect from the ICEV 104, 210 using the proximity sensors 106, 228 to navigate the proper connection of the electromagnets 118, 122 and 204, 206, respectively. Moreover, the distance and motion tracking data received from the interaction of the external cameras and the sensors 106, 228 may be used to identify potentially hazardous circumstances when the EV 102, 200 should disengage from the ICEV 104, 210 or otherwise reduce the driving velocity of the two vehicles in order to avoid collisions and accidents.

For example, in some embodiments, a user may hitch an EV 200 (e.g., Telsa) to a motorhome ICEV 210 using the towing system 202 disclosed herein. In some embodiments, the FSD capability of the Tesla may be utilized to effectuate the connection. In other words, the Tesla (EV 200) approaches the tongue 208 until the EV electromagnet 204 couples to the tongue electromagnet 206. However, in other embodiments, a user may connect them by physically driving either the EV 200 or the ICEV 210 to couple them to each other.

A wireless communication protocol or wired communication protocol (e.g., via the wiring harness 116) may be used to effectuate communication between the vehicles 200, 210. The connection includes software that assists with automatic braking systems so that the EV 200 can assist with braking, traction control, throttle, and other components. When braking, the batteries in the EV 200 may be charged through regenerative braking systems known in the art. It will be appreciated that such a hybridized driving connection and integrated software reduces fuel consumption and related carbon emissions. Moreover, the interface of the FSD mode may facilitate a safer towing experience while driving the ICEV 210 and optimize the performance of both vehicles.

Figure 12:
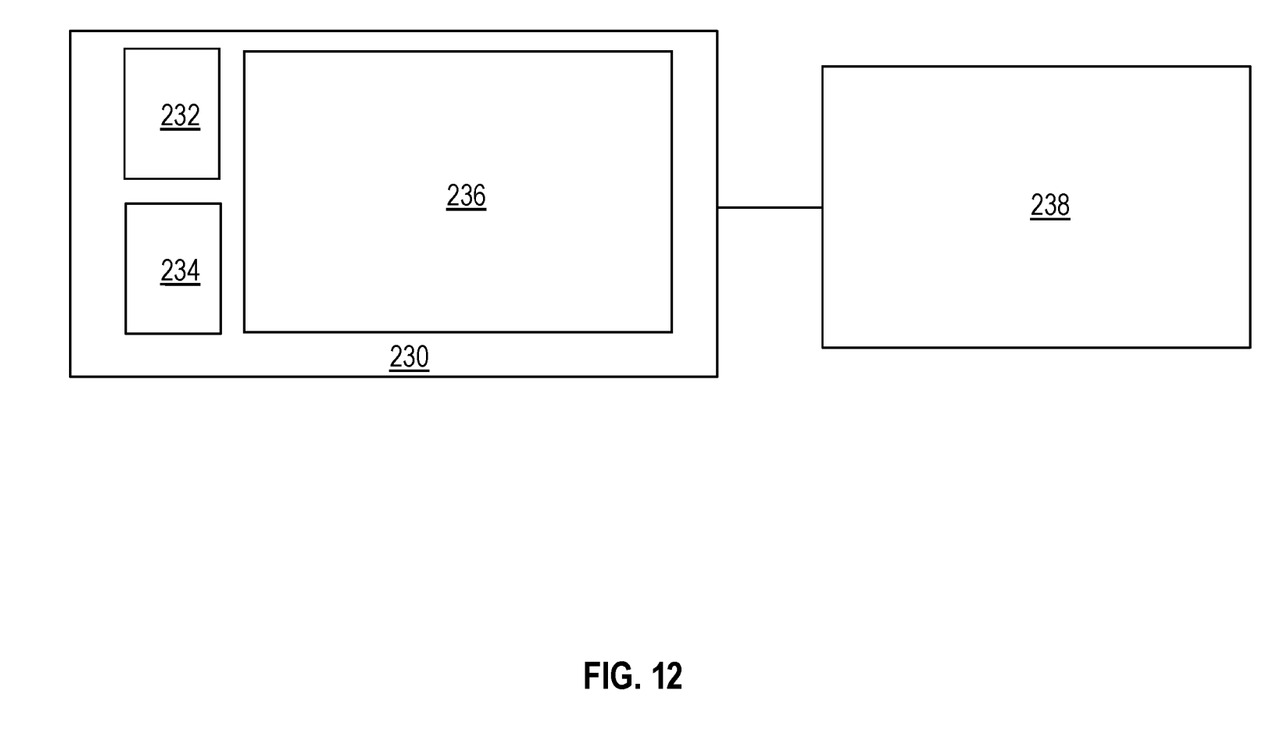
FIG. 12 illustrates a block diagram one or more controllers of a towing system.

As shown in FIG. 12, it will be appreciated that the towing system 202 may comprise a towing control module 230 (TCM), which may comprise one or more controllers 232 (e.g., microcontroller), a transceiver 234 (e.g., wired or wireless), and a user input/output interface 236 (e.g., screens, buttons, lights, etc.), which may allow a user to control and receive information regarding the towing, and which facilitates communication between the ICEV 210 and the EV 200 during transport. For example, the user input/output interface 236 may be on the TCM 230 directly and may comprise a touch screen, buttons, switches, etc., or may be an application that is configured to launch on a smartphone, tablet, or computer using wired or wireless protocols (e.g., Bluetooth®). The user interface 236 may comprise numerous indicators, including connection indicators of the electromagnets 204, 206, state of charge indicators, FSD status and indicators, voltage indicators, and others. The indicators may be lights or readouts. In addition, a user may adjust or set functions, such as changing the output voltage (e.g., 110V or 220V), changing output type (e.g., AC or DC), setting an automatic start/stop point (such as when the state of charge of the vehicle batteries drops below a predetermined set threshold), among other features.

Additionally, the TCM 230 may allow a user to engage and disengage the electromagnets and control other components (e.g., pivoting of tongue 208, etc.). It will be appreciated that the tow system 202 may comprise one or more TCMs 230, such as one on each of the vehicles.

In some embodiments, the wiring harness 116 may allow power to transfer between the EV 102 and the ICEV 104. For example, if an ICEV 104 is plugged into a power source (e.g., power grid) when parked, any excess power can flow to the EV 102 to ensure that the batteries of the EV 102 remain charged. In other circumstances, when grid power is not available to the ICEV 104, the batteries of the EV 102 may supply power to the ICEV 104 for its use. Accordingly, it will be appreciated that an inverter may convert DC power from the batteries of the EV 102 to AC power usable in the ICEV or by a user. It will be appreciated that a battery management system (BMS) 238, which may include a charge controller, may be used to monitor the power status of all components to ensure the desired state of charge of batteries is maintained, as desired. For example, if a user is utilizing inverted AC power in the RV ICEV 104, the BMS 238 may terminate transmission of power from the batteries when the batteries have reached a predetermined threshold (e.g., 20%), ensuring that the EV 102 has sufficient battery for a desired mileage. Further, the BMS/controller 238 may wirelessly communicate with a smartphone, or other device, allowing a user to monitor and control the battery status, charge status, etc. of the various components of the system.

Figure 13:
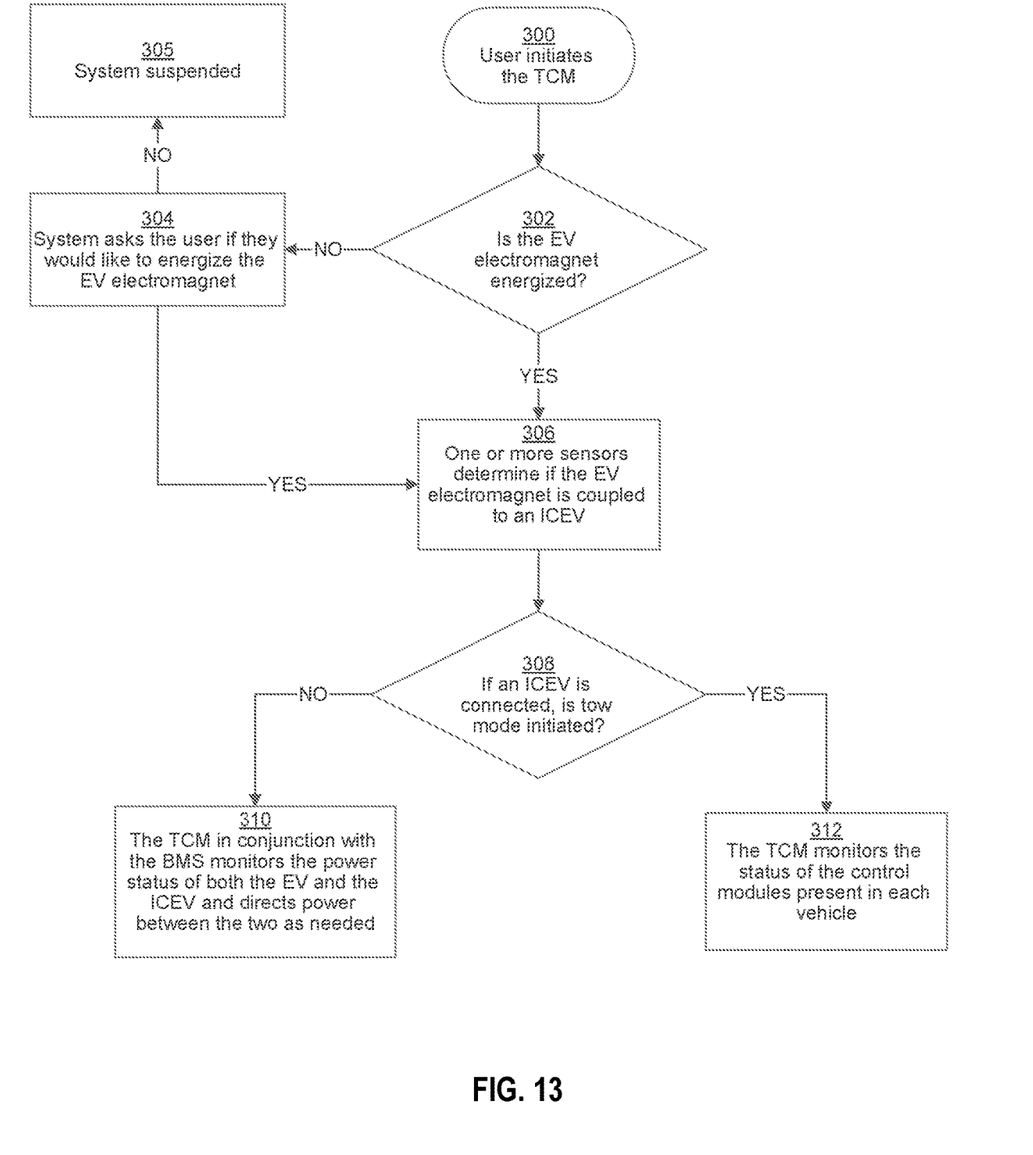
FIG. 13 illustrates a flow chart of a towing system.

Referring to the flowchart in FIG. 13, the software on the TCM 230 may control the towing system 100, 202 in a variety of manners. For example, a user may initiate the TCM 230 at step 300. At step 302, the system checks if the EV electromagnet 204 is energized. If not, the system asks the user, at step 304, if they would like to energize the EV electromagnet 204. If not, then at step 305, the system is suspended and awaits user input. At step 306, once the EV magnet 204 is energized, one or more sensors are then used to determine if the EV electromagnet 204 is coupled to an ICEV 210. The sensors may include sensors 228 (which may be on the EV or on the EV electromagnet 204 and may include proximity sensors, cameras, etc.), signal contacts 207A-B in contact with signal contacts 211A-B, but may also include pressure switches or electrical switches coupled to the EV electromagnet 204 such that the TCM 230 is capable of determining when the EV electromagnet 204 is coupled to the ICEV 210. Additionally, as discussed earlier herein, one or more signal contacts 207A-B of the EV electromagnet 204 may be in contact with one or more signal contacts 211A-B of the tongue electromagnet 206, allowing the TCM 230 to detect, via said signal contacts, when the electromagnets 204, 206 are coupled together. At step 308, if an ICEV is connected, a user is able to initiate towing mode. At step 310, if towing mode is not initiated, the TCM 230 in conjunction with the BMS 238 may monitor the power status of both the EV 200 and ICEV 210 and direct power between the two as needed. In other words, if the ICEV 210 does not have access to grid power and a user desires to use a TV, the TCM 230 and BMS 238 transmit and invert power from the batteries of the EV 200 to the ICEV 210.

If tow mode is initiated, then at step 312, the TCM 230 monitors the status of the control modules present in each vehicle (e.g., engine control module, powertrain control module, transmission control module, brake control module, central control module, central timing module, general electronic module, etc.). For example, if the TCM 230 detects activation of the braking control module of the ICEV 210, the TCM 230 can initiate the braking control module of the EV 200 to thereby assist the braking of the ICEV 210. In another example, if the TCM 230 detects a low gear at a high (predetermined) RPM, indicating that the ICEV 210 may be ascending a hill, the TCM 230 may communicate to the electric motor control module of the EV 200 to assist by causing the EV 200 to accelerate by activating the relevant motor(s) of the EV 200. Additionally, the TCM 230 may activate other systems of the EV 200, such as the lighting systems, driving systems, and other systems that may be beneficial.

While electromagnets have been described herein, similar magnetic systems may be used, such as permanent magnets that are mechanically actuated using a lever (as is known in the art of lifting magnets). Additionally, prior art towing mechanisms may also be used, such as a ball and ball receiver, locking pins and cotter pins, etc. In both the permanent magnet embodiment and prior art towing embodiments, while the EV 102, 200 would not be capable of automatically disconnecting itself in the event of an accident, it would still be able to assist the ICEV 104, 210 to improve towing efficiency and safety.

The TCM 230 and/or BMS 238 may take different forms, such as electronic control modules (ECMs), computers, tablets, handheld devices (e.g., mobile phones, microprocessor-based or programmable consumer electronics, minicomputers, multi-processor systems, network PCs, distributed computing systems, datacenters, message centers, routers, switches, and even devices that conventionally have not been considered a computing system, such as wearables (e.g., glasses, head-mounted displays)). The TCM 230 and/or BMS 238 may also be a distributed system that includes one or more connected computing components/devices that are in communication. Accordingly, the TCM 230 and/or BMS 238 may be embodied in any form and is not limited to any particular embodiment explicitly shown herein.

In its most basic configuration, the TCM 230 includes at least one hardware processing unit (aka a "processor"), input/output (I/O) interfaces, and storage.

The storage may be physical system memory, which may be volatile, non-volatile, or some combination of the two. The term "memory" may also be used herein to refer to non-volatile mass storage such as physical storage media. If the TCM 230 is distributed, the processing, memory, and/or storage capability may be distributed as well. As used herein, the term "executable module," "executable component," or even "component" can refer to software objects, routines, or methods that may be executed on the battery management system. The different components, modules, engines, and services described herein may be implemented as objects or processors that execute on the TCM 230 (e.g., as separate threads).

Computer storage media are hardware storage devices, such as RAM, ROM, EEPROM, CD-ROM, solid state drives (SSDs) that are based on RAM, flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The disclosed embodiments may comprise or utilize a special-purpose or general-purpose computer including computer hardware, such as, for example, one or more processors (such as the hardware processing unit, which may include one or more central processing units (CPUs), graphics processing units (GPUs) or other processing units) and system memory (such as storage).

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code.

While not all computing systems require a user interface, in some embodiments, the TCM 230 and/or BMS 238 includes, as part of the I/O interfaces, a user interface 236 for use in communicating information to/from a user. The user interface 236 may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, controllers, projections, holograms, cameras, keyboards, stylus, mouse, or other pointer input, sensors of any type, and so forth. The TCM 230 and/or BMS may perform certain functions in response to detecting certain user input.

Further, the TCM 230 and/or BMS 238 may also include communication channels allowing the TCM 230 and/or BMS 238 to be in wireless (e.g., Bluetooth®, Wi-Fi®, satellite, infrared, etc.) or wired communication with the battery management and computer system of the electric vehicle 200, along with its networks, and/or other remote systems/devices. Remote systems/devices may be configured to perform any of the processing described with regard to the TCM 230 and/or BMS.

In some embodiments, the TCM 230 and/or BMS 238 includes computer-executable instructions (e.g., stored on storage) that enable the TCM 230 and/or BMS 238 (e.g., by one or more processors executing the computer-executable instructions) to selectively activate or deactivate any portion of the electric vehicle 200, such as its motors, brakes, lighting systems/indicators, driving modes, etc. In some instances, the TCM 230 and/or BMS selectively deactivates or activates at least one component of the system in response to a triggering event. As one example, a triggering event may include detecting that the ICEV 210 is braking, with the TCM 230 initiating the braking system of the electric vehicle 200 to thereby assist the ICEV 210 in stopping. Other triggering events may include gear to RPM ratios of the ICEV 210, power status of the ICEV 210 (whether engine is running or whether connected to grid power, for example), power status of the batteries of the EV 200, etc.

Accordingly, it will be appreciated from the foregoing that the towing system 100, 202 solves the need for a towing system that enables cooperative communication and dynamic interaction between an ICEV when towed by a self-driving EV. In particular, the towing system disclosed herein enables the self-driving EV to assist in steering control, lane changes, shifting, and deacceleration while also charging the EV's battery through regenerative braking while being towed by a traditional ICEV.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A towing system, comprising:
    a first electromagnet coupled to a front end of an electric vehicle;
    a hinged license plate configured to selectively conceal or expose the first electromagnet;
    a tongue extending rearwardly from an internal combustion vehicle, the tongue comprising a second electromagnet at a distal end thereof; and
    at least one towing control module;
    wherein the at least one towing control module is configured to control the status of the first and second electromagnets and is further configured to monitor and control one or more control modules of the electric vehicle.

2. The towing system of claim 1, further comprising a hitch extending from the front of the electric vehicle, the hitch comprising an elongated shaft receivable within a channel of a receiver tube of a hitch receiver extending rearwardly from the internal combustion vehicle.

3. The towing system of claim 2, wherein when the elongated shaft is mated with the channel, a first electromagnetic plate on the hitch contacts a second electromagnetic plate on the hitch receiver.

4. The towing system of claim 1, further comprising one or more sensors on the electric vehicle in communication with the towing control module, the towing control module configured to determine the position of the electric vehicle in relation to the internal combustion vehicle.

5. A towing system, comprising:
   a first electromagnet coupled to front end of an electric vehicle;
   a hinged license plate configured to selectively conceal or expose the first electromagnet;
   a tongue extending rearwardly from an internal combustion vehicle, the tongue comprising a second electromagnet at a distal end, the second electromagnet being selectively couplable to the first electromagnet; and
   at least one towing control module;
   wherein the at least one towing control module is configured to:
   a. control the status of the first and second electromagnets,
   b. monitor and control one or more control modules of the electric vehicle, and
   c. monitor and control power distribution between the electric vehicle and the internal combustion vehicle.

6. The towing system of claim 5, wherein the first electromagnet comprises one or more high-voltage electrical contacts and one or more signal contacts, and the second electromagnet comprises one or more high-voltage electrical contacts and one or more signal contacts each configured to mate with those of the first electromagnet, respectively.

7. The towing system of claim 5, wherein the first electromagnet further comprises one or more proximity sensors in communication with the towing control module, the towing control module configured to determine the position of the electric vehicle in relation to the internal combustion vehicle using the one or more proximity sensors.

8. The towing system of claim 5, wherein the at least one towing control module comprises a microcontroller, a transceiver, and a user input/output interface.

9. The towing system of claim 8, wherein the user input/output device comprises a touchscreen.

10. The towing system of claim 5, wherein in response to detecting one or more triggering events, the towing control module initiates one or more of the following on the electric vehicle:
   a. a braking system,
   b. an acceleration system,
   c. a lighting system, and
   d. power transfer from one or more batteries of the electric vehicle to the internal combustion vehicle.

11. A method of towing an electric vehicle with an internal combustion vehicle using a towing system, the method comprising:
   initiating a towing control module;
   actuating a license plate on the electric vehicle to expose a first electromagnet;
   energizing the first electromagnet via the towing control module;
   coupling the electric vehicle via the first electromagnet to the internal combustion vehicle via a second electromagnet at a distal end of a tongue extending from the internal combustion vehicle;
   monitoring, via the towing control module, a plurality of control modules of the electric vehicle and the internal combustion vehicle; and
   in response to detecting one or more triggering events, activating one or more vehicle systems of the electric vehicle.

12. The method of claim 11, wherein the one or more triggering events comprise:
   a. application of brakes of the internal combustion vehicle;
   b. a high RPM of the internal combustion vehicle;
   c. one or more lights activated on the internal combustion vehicle; and
   d. a lower power status of the internal combustion vehicle.

13. The method of claim 12, wherein in response to detecting the one or more triggering events, the towing control module activating one or more of:
   a. a braking system of the electric vehicle;
   b. an acceleration system of the electric vehicle;
   c. a lighting system of the electric vehicle; and
   d. transmission of power from one or more batteries of the electric vehicle to the internal combustion vehicle.

* * * * *